Figure 8:
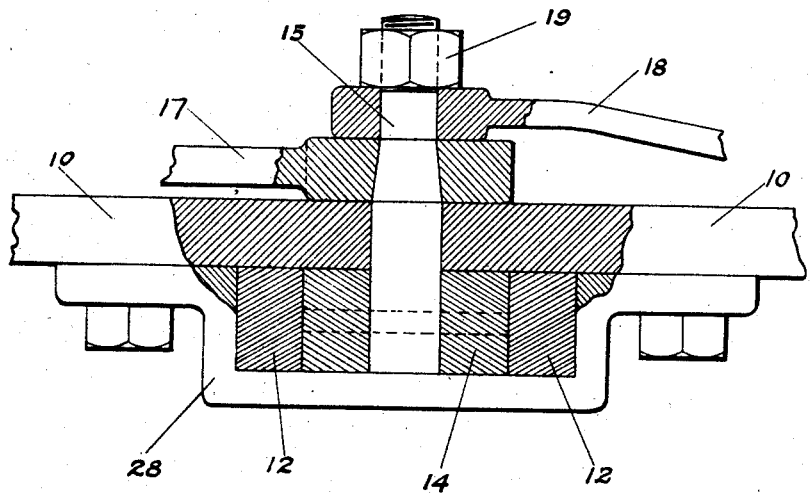

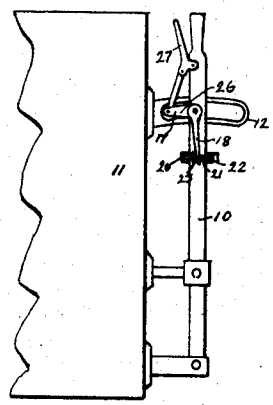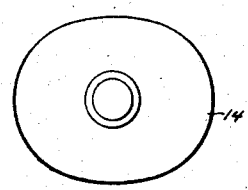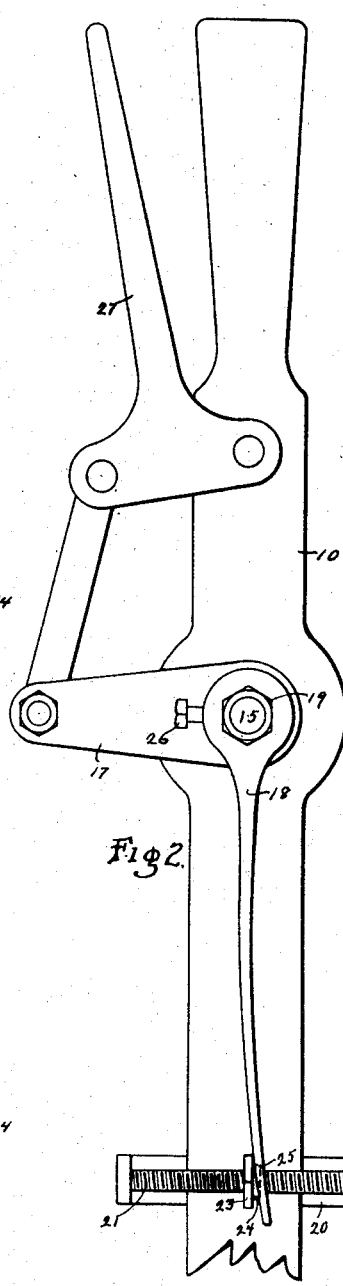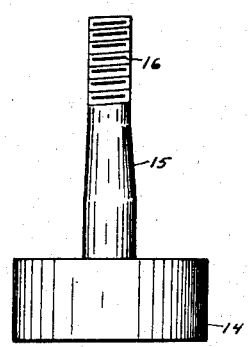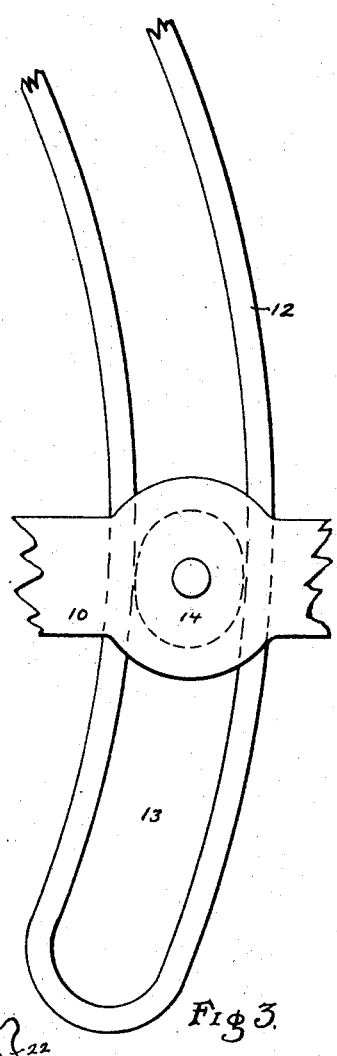

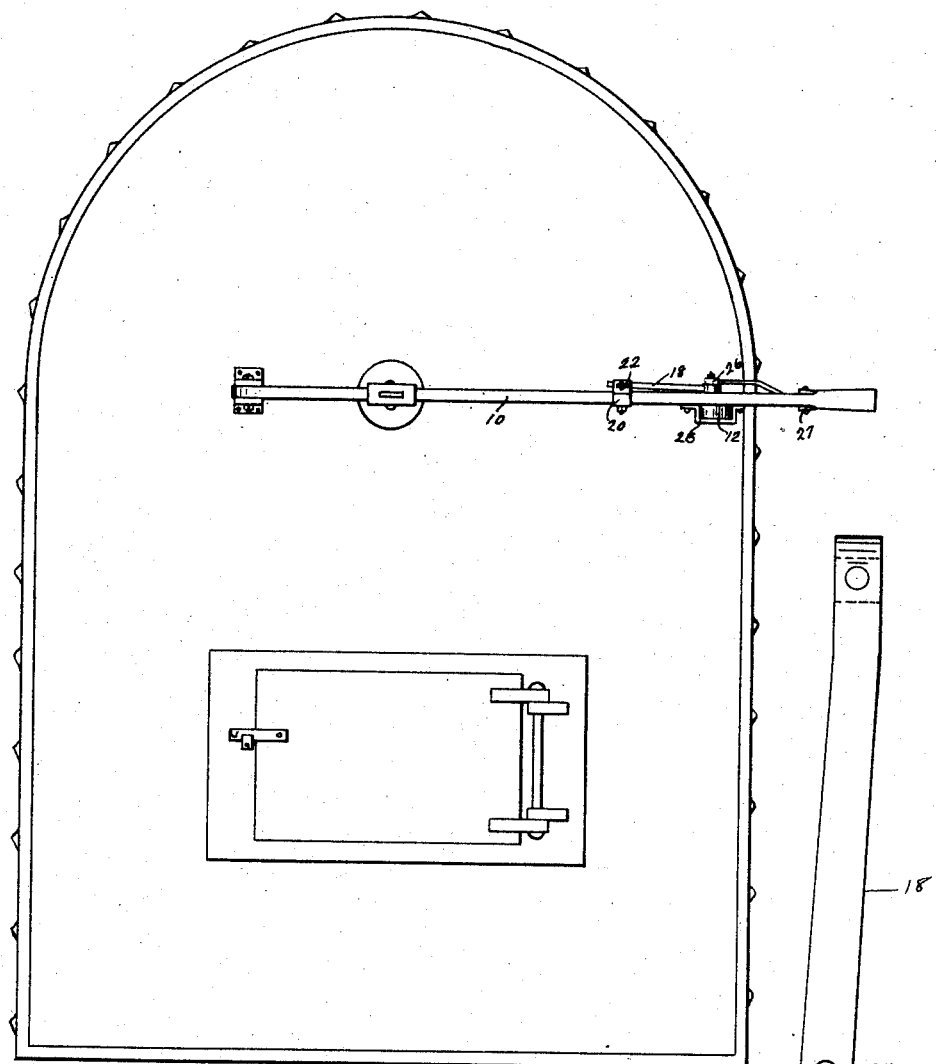

A. J. McGINN.
FRICTION LEVER LATCH.
APPLICATION FILED MAR. 9, 1908.

907,391.

Patented Dec. 22, 1908.
3 SHEETS—SHEET 3.

WITNESSES
Mary Sholderer
W. P. Sampson.

Arthur J. McGinn INVENTOR

BY
L. L. Westfall his ATTORNEY

UNITED STATES PATENT OFFICE.

ARTHUR J. McGINN, OF KALISPELL, MONTANA.

FRICTION LEVER-LATCH.

No. 907,391.  Specification of Letters Patent.  Patented Dec. 22, 1908.

Application filed March 9, 1908. Serial No. 419,859.

*To all whom it may concern:*

Be it known that I, ARTHUR J. McGINN, a citizen of the United States, residing at Kalispell, in the county of Flathead and State of Montana, have invented certain new and useful Improvements in Friction Lever-Latches, of which the following is a specification.

This invention pertains to lever latches, and applies the friction principle to serve the purpose of latching a lever at any desired position. The usual method of latching a lever is by the use of pawls operating in a ratchet.

My invention is particularly adapted for the regulation of throttle-levers where slight variations of the position of the lever and exactness are required or desired and where safety and practicability require that the lever shall remain where set until purposely re-set.

Where a pawl and ratchet are used as a lever latch, there is no possibility of setting the lever to a greater degree of fineness than the full length of a ratchet, which often requires the throwing of the lever too far and if set back again the length of a ratchet, it is not far enough, thereby necessitating the continual adjusting and re-adjusting of the lever and at the same time failing to get a uniform adjustment of the amount of steam or power required or desired or a uniform motion of the machinery. Furthermore pawls are apt to be thrown from the ratchet by the motion and jarring of the machinery.

By the use of my friction clutch device I am able to set the lever at any desired location, thereby being enabled to adjust the amount of steam or power to be admitted for the moving mechanism, which makes it an easy matter to secure a steady motion and uniform moving of the parts of the machinery and also save the possibility of the lever being moved from its setting by the jarring motions of the machinery.

My invention is particularly desirable for use upon a locomotive engine. I have therefore shown the application of the device to a locomotive engine lever.

In the path of the throttle-lever and secured to the end of the boiler of the engine by a ball and socket joint or otherwise is a curved slotted arm. Adjusted to the slot in the arm is an oval shaped clutch so connected with the lever that when the lever is released the clutch will bind in the slot and when the lever is gripped by the hand of the operator, the same will be released as hereinafter explained. The force of an adjustable steel spring is applied to the clutch to give the binding effect.

In the drawings, Figure 1, is an elevation of the end of an engine boiler with lever and latch attachments, showing side of the curved slotted arm and end of clutching device, Fig. 2, is an enlarged elevation of the upper end of the lever, showing the adjustable steel spring appliance, Fig. 3, is an enlarged elevation of the slotted arm together with a broke-away portion of the lever and showing the position of the oval clutch as it relates to the curved slotted arm and the lever, Fig. 4, is an enlarged end elevation of the oval clutch, detached, Fig. 5, is a side elevation of the same, Fig. 6, is an enlarged elevation of the steel spring and Fig. 7, is an end elevation of an engine boiler, showing the end of the curved slotted arm and edge of the spring and lever. Fig. 8 is a transverse section of the lever and a cross section of the slotted arm, oval clutch and other parts and shows their relation to other features of the mechanism.

In the application of the device to a throttle-lever on a locomotive engine, as shown in the drawings, a lever 10 is secured to the engine boiler 11 in the usual way. Secured also to the end of the boiler 11 in the path of the lever 10, by a ball and socket joint, or otherwise, is a curved slotted arm 12. Slidably adjusted in the oblong slot 13 of the curved arm 12 is the oval friction clutch 14, cast with which is the tapered shaft 15, the end 16 of which is threaded.

In the adjustment of the oval friction brake 14 to the oblong slot 13, the tapered shaft 15 passes through an opening in the lever 10, also through an opening in the arm 17 and the end of the spring 18, a nut 19 engaging the threaded end 16. A rack 20 is secured to the lever 10 carrying a threaded shaft 21 adapted to be turned by a thumbscrew 22. A nut 23 with a shoulder 24 engages the threaded shaft 21, the shoulder 24 engaging the opening 25 in the lower end of the spring 18 to prevent the nut 23 from turning with the threaded shaft 21.

In the adjustment of the tapered shaft 15 through the arm 17 and the upper end of the spring 18, the arm 17 and spring 18 are made to bind on the tapered surface of the shaft 15, the nut 19 being turned securely and firmly against the spring 18. A set screw 26 bearing against the shaft 15 also helps to retain the spring 18 immovably upon the same.

The relative adjustment of the oval friction brake 14 to the oblong slot 13, and the shaft 15 to the arm 17 and spring 18, must be so that when the latch 27 is drawn against the top of the lever 10, the oval friction clutch 14 will slide in the oblong slot 13 and when the latch 27 is released and allowed to resume the position shown in Fig. 2, the same will be turned sufficiently in the oblong slot 13 by the tension of the spring 18 to incline the greater diameter of the oval clutch 14 crosswise of the oblong slot 13 sufficiently to bind the clutch 14 within the slot 13 so that the same will be immovable until the clutch is turned so that its shorter diameter will engage the sides of the oblong slot 13 by the lifting of the latch 27 when the same will again be allowed to slide in the oblong slot to the position where it is desired to anchor the same, when the latch 27 may be again released and the clutch again set in its bearings consisting of the outer edges of the oblong slot 13. In order to prevent the slotted arm 12 from spreading by the outward pressure of the clutch 14, I have secured a yoke 28 to the lever 10 in such a position that the same will engage the outer surface of the curved slotted arm 12 and follow the same in the movements of the lever 10 backward and forward, serving to bind the slotted arm 12 always where the clutch 14 has a tendency to spread the same.

The tension of the spring 18 is regulated by the threaded shaft 21 turned by the thumb-screw 22, the threaded shaft 21 passing through the oblong slot 25 in the lower end of the spring 18, the nut 23 being stationary with the end of the spring 18, so that when the threaded shaft 21 is turned the nut 23 and the lower end of the spring 18 will be conveyed backward or forward or to a greater or less tension as is desired or required.

Having thus described my invention, what I claim as new and useful and desire to secure by Letters-Patent, is,

In a lever latch, the combination of a lever with a curved slotted arm, an oval shaped clutch engaging the slot in the arm and being connected by a shaft to the lever, a tension spring also engaging the shaft, and being made adjustable for greater or less strength, a yoke secured to the lever engaging the outer surface of the curved slotted arm and following the friction clutch in its movements within the slotted arm, the oval clutch being adjusted to bind within the slotted arm or be released by means of the lever latch, substantially as set forth.

In testimony whereof I have affixed my signature, in presence of two witnesses.

ARTHUR J. McGINN.

Witnesses:
C. G. PENCE,
W. R. SAMPSON.